United States Patent
Kim et al.

(10) Patent No.: US 9,189,097 B2
(45) Date of Patent: Nov. 17, 2015

(54) DISPLAY DEVICE WITH INTEGRATED IN-CELL TOUCH SCREEN AND METHOD OF DRIVING THE SAME

(71) Applicant: LG DISPLAY CO., LTD., Seoul (KR)

(72) Inventors: Sung Chul Kim, Goyang-si (KR); Seong Mo Seo, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/045,619

(22) Filed: Oct. 3, 2013

(65) Prior Publication Data

US 2014/0160041 A1 Jun. 12, 2014

(30) Foreign Application Priority Data

Dec. 11, 2012 (KR) .................. 10-2012-0143994

(51) Int. Cl.
*G06F 3/041* (2006.01)

(52) U.S. Cl.
CPC ............ *G06F 3/0412* (2013.01); *G06F 3/0416* (2013.01)

(58) Field of Classification Search
CPC .......... G02F 1/13338; G02F 1/134336; G02F 1/13306; G02F 1/134309; G02F 1/1368; G02F 2001/134318; G06F 3/0412; G06F 3/044; G06F 3/0416; G09G 3/3655
USPC ................. 345/173–178; 178/18.01–18.11, 178/19.01–19.03
See application file for complete search history.

(56) References Cited

U.S. PATENT DOCUMENTS

| | | | |
|---|---|---|---|
| 2008/0309627 A1* | 12/2008 | Hotelling et al. | 345/173 |
| 2010/0110037 A1 | 5/2010 | Huang et al. | |
| 2010/0207902 A1* | 8/2010 | Juan et al. | 345/173 |
| 2011/0090160 A1 | 4/2011 | Chen et al. | |
| 2012/0044150 A1* | 2/2012 | Karpin et al. | 345/173 |
| 2012/0081320 A1* | 4/2012 | Hwang et al. | 345/173 |
| 2012/0098786 A1 | 4/2012 | Kuang | |
| 2012/0162134 A1* | 6/2012 | Chen et al. | 345/174 |
| 2012/0262390 A1* | 10/2012 | Kida et al. | 345/173 |
| 2012/0274603 A1* | 11/2012 | Kim et al. | 345/174 |
| 2014/0055685 A1* | 2/2014 | Wang | G06F 3/0412 349/12 |
| 2014/0062944 A1* | 3/2014 | Wang | G06F 3/0412 345/174 |
| 2014/0247402 A1* | 9/2014 | Chou | G02F 1/13338 349/12 |

FOREIGN PATENT DOCUMENTS

| | | |
|---|---|---|
| KR | 10-2012-0034502 A | 4/2012 |
| TW | 201017501 A | 5/2010 |
| TW | 201115532 A | 5/2011 |
| TW | 201218053 A | 5/2012 |

* cited by examiner

*Primary Examiner* — Lun-Yi Lao
*Assistant Examiner* — Elliott Deaderick
(74) *Attorney, Agent, or Firm* — Birch, Stewart, Kolasch & Birch, LLP

(57) ABSTRACT

Discussed is a display device with integrated touch screen including a panel including a plurality of electrodes; a data driver for converting RGB data inputted from a timing controller into a data voltage, and supplying the data voltage to data lines; a gate driver for sequentially supplying a gate signal to gate lines so as to apply the data voltage to pixels of the panel during a high logic period of a horizontal sync signal; and a touch IC for supplying the touch scan signal to the plurality of electrodes every low logic period of the horizontal sync signal, wherein the touch IC applies the touch scan signal, at least once, to each of the electrodes during one frame.

11 Claims, 7 Drawing Sheets

DISPLAY DEVICE WITH INTEGRATED IN-CELL TOUCH SCREEN AND METHOD OF DRIVING THE SAME

CROSS REFERENCE TO RELATED APPLICATIONS

This application claims the benefit of the Korean Patent Application No. 10-2012-0143994 filed on Dec. 11, 2012, which is hereby incorporated by reference as if fully set forth herein.

BACKGROUND

1. Field of the Disclosure

Embodiments of the present invention relate to a display device, and more particularly, to a display device with integrated touch screen.

2. Discussion of the Related Art

Touch screens are a type of input device that is included in image displaying devices such as Liquid Crystal Displays (LCDs), Field Emission Displays (FEDs), Plasma Display Panel (PDPs), Electroluminescent Displays (ELDs), and Electrophoretic Display (EPDs), and allows a user to input information by pressing or touching a touch sensor of a screen with a finger, a pen or the like while a user looks at the screen of the image displaying device.

Recently, there is an increasing demand for a display device with integrated touch screen of in-cell type in which elements constituting the touch screen are provided inside the display device so as to realize slimness in mobile terminals such as smart phone and tablet PC.

In case of a general in-cell type touch screen display, touch data is transmitted to a system once every one vertical sync signal Vsync to define one frame period. In this case, a frequency for transmitting new data to all pixels of a panel is referred to as a display frame rate. In the general in-cell type touch screen display, the touch data is transmitted once to the system every one vertical sync signal Vsync to define one frame period.

Hereinafter, a driving method of a general display device with integrated touch screen of in-cell type will be described with reference to FIG. 1.

FIG. 1 is a timing diagram illustrating signals of display time and touch time according to one vertical sync signal in a general display device with integrated touch screen.

In case of a general display device with integrated self-capacitive touch screen of an in-cell type, as shown in FIG. 1, display time (D) and touch time (T) are time-divisionally driven according to a data enable DE signal during one frame based on one vertical sync signal.

SUMMARY

Accordingly, embodiments of the present invention are directed to a display device with integrated touch screen and a method of driving the same that substantially obviate one or more problems due to limitations and disadvantages of the related art.

An aspect of embodiments of the present invention is directed to provide a display device with integrated touch screen, which facilitates to drive a display driving mode and a touch driving mode according to a horizontal sync signal, and a method of driving the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a display device with integrated touch screen that may include a panel including a plurality of electrodes; a data driver for converting RGB data inputted from a timing controller into a data voltage, and supplying the data voltage to data lines; a gate driver for sequentially supplying a gate signal to gate lines so as to apply the data voltage to pixels of the panel during a high logic period of a horizontal sync signal; and a touch integrated circuit (touch IC) for supplying the touch scan signal to the plurality of electrodes every low logic period of the horizontal sync signal, wherein the touch IC applies the touch scan signal, at least once, to each of the electrodes during one frame.

In another aspect of an embodiment of the present invention, there is provided a method of driving a display device with integrated touch screen comprising a panel including a plurality of electrodes, a touch IC, a gate driver, and a data driver, that may include applying a data voltage to pixels of the panel during a high logic period of a horizontal sync signal by the gate driver and the data driver; and supplying the touch scan signal to the plurality of electrodes every low logic period of the horizontal sync signal by the touch IC wherein the step of applying the touch scan signal is carried out by applying the touch scan signal, at least once, to each of the electrodes during one frame.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments of the present invention will be described in detail with reference to the accompanying drawings.

Figure 1:
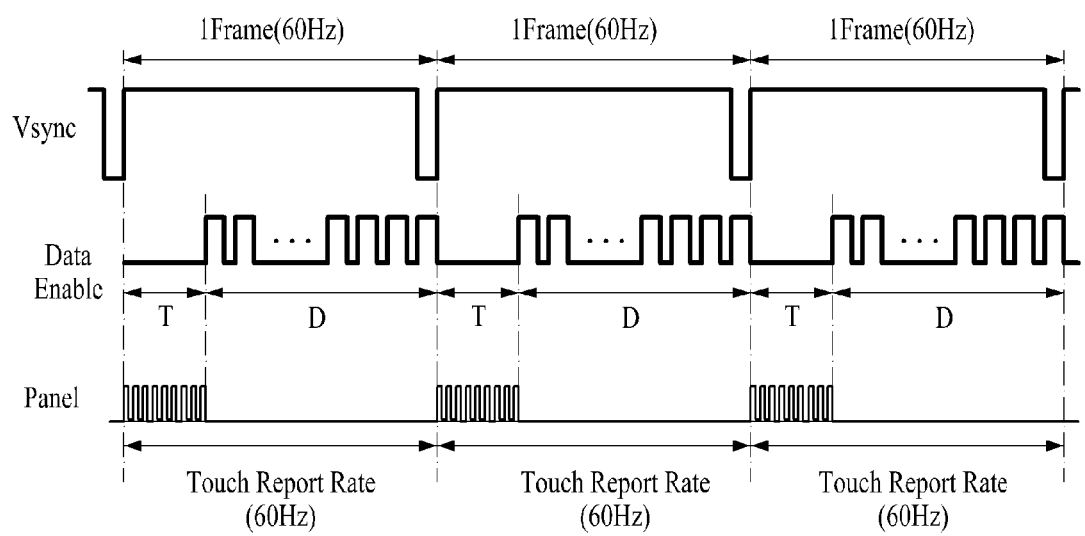
FIG. 1 is a timing diagram illustrating signals of display time and touch time according to one vertical sync signal in a general display device with integrated touch screen.
Figure 2:
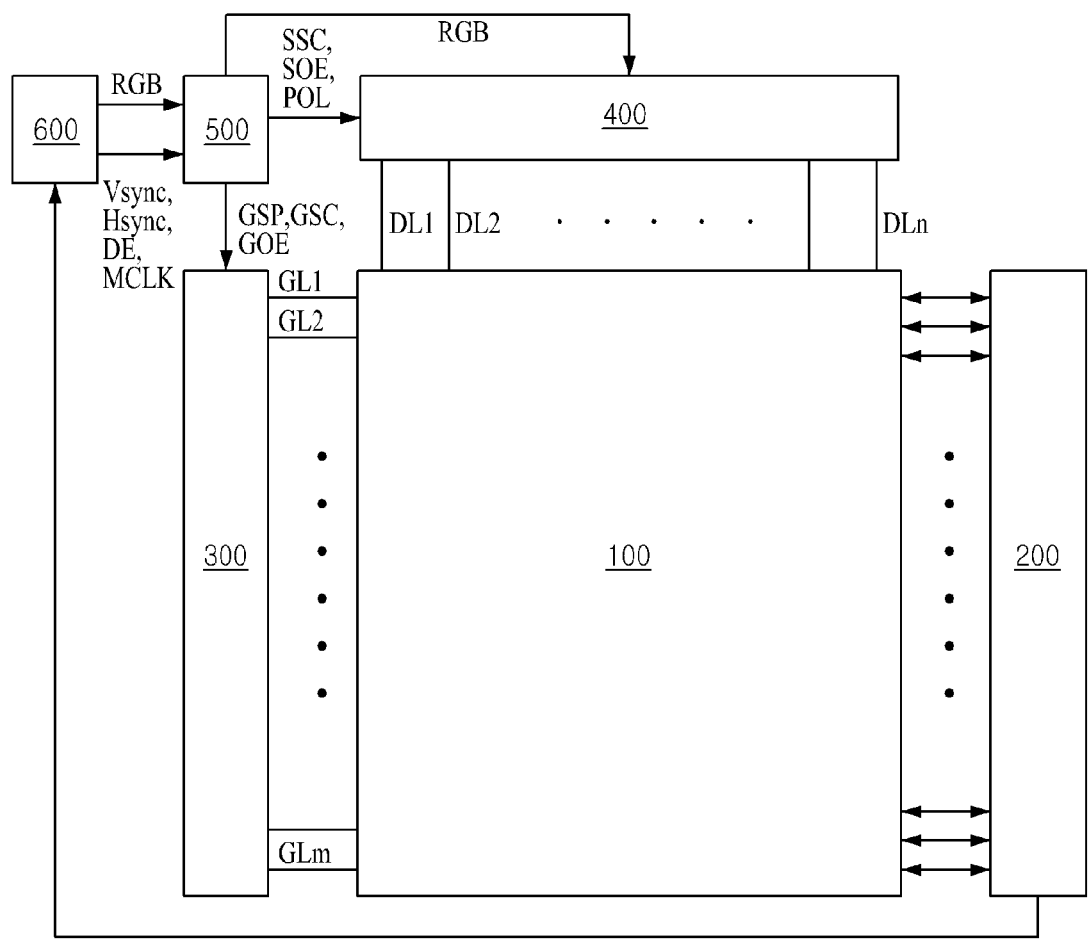
FIG. 2 illustrates a display device with integrated touch screen according to one embodiment of the present invention.
Figure 3:
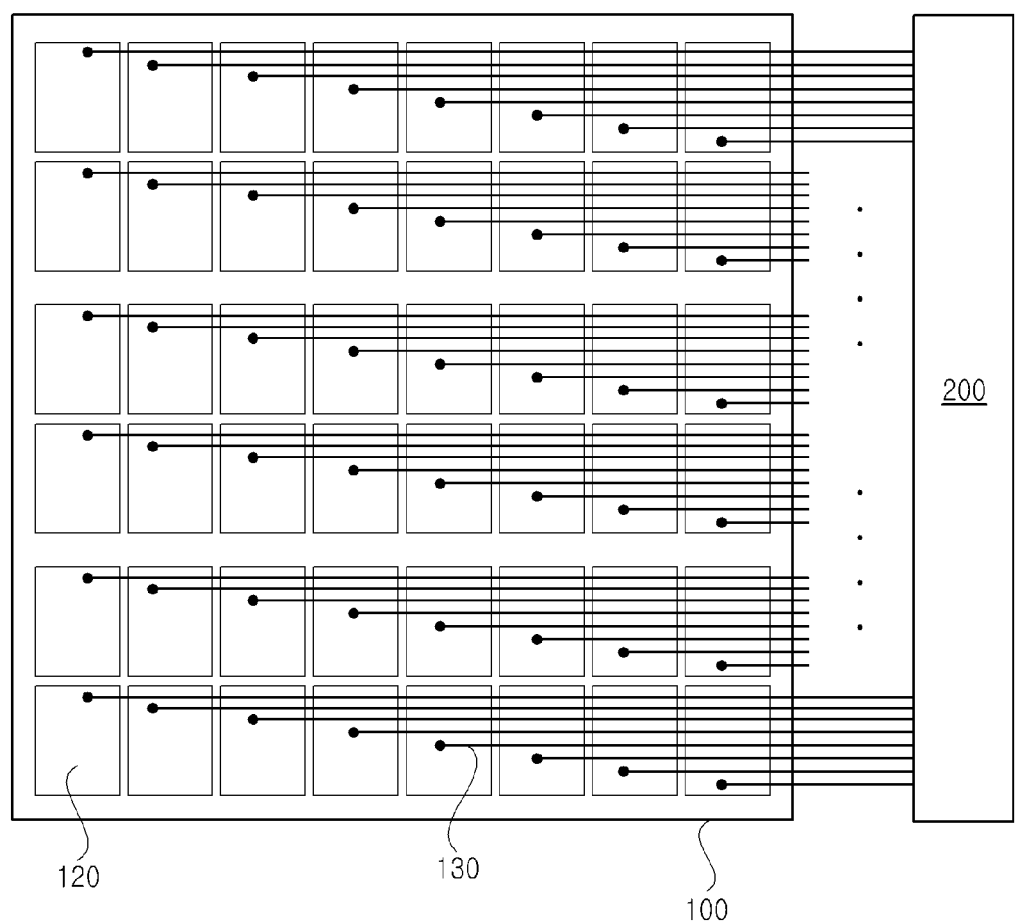
FIG. 3 illustrates a panel and a touch IC in a display device with integrated touch screen according to one embodiment of the present invention.
Figure 4:
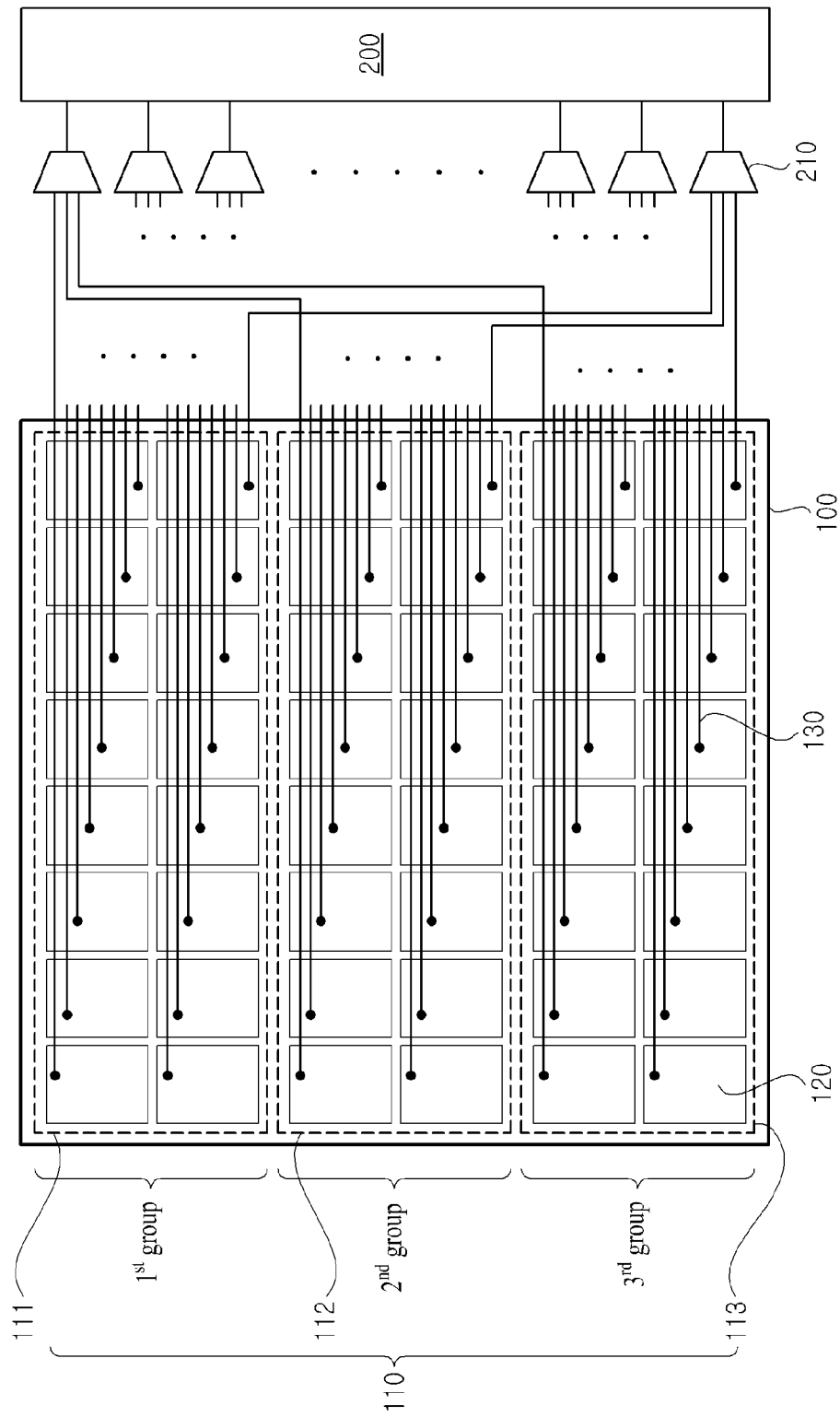
FIG. 4 illustrates a panel and a touch IC in a display device with integrated touch screen according to another embodiment of the present invention.

FIG. 2 illustrates a display device with integrated touch screen according to one embodiment of the present invention. FIG. 3 illustrates a panel and a touch IC in a display device with integrated touch screen according to one embodiment of the present invention. FIG. 4 illustrates a panel and a touch IC in a display device with integrated touch screen according to another embodiment of the present invention.

As shown in FIGS. 2 to 4, the display device with integrated touch screen according to one embodiment of the present invention may include a panel 100, a touch IC 200, a switch 210, a gate driver 300, a data driver 400, a timing controller 500, and a system 600.

A touch screen (not shown) is provided inside the panel 100. The touch screen senses a user's touch location. Especially, the touch screen applied to the present invention is an in-cell type touch screen of a self-capacitive type which is time-divisionally driven in display driving and touch driving modes.

The panel 100 may be configured with lower and upper glass substrates, and a liquid crystal layer formed between the two glass substrates. In this case, a plurality of gate lines, a plurality of data lines, and a plurality of thin film transistors (TFT) are formed on the lower substrate of the panel 100. In this case, the gate and data lines cross each other, to thereby define a plurality of pixels in a matrix configuration. Also, each thin film transistor is formed adjacent to a crossing region of the gate and data lines.

As shown in FIG. 3, the panel 100 may include a plurality of electrodes 120, and a plurality of lines 130.

If applying a common voltage for a display driving of the panel 100, the plurality of electrodes 120 may operate as a common electrode, wherein the electrode, together with a pixel electrode formed in each pixel, drives liquid crystal. Meanwhile, if applying a touch scan signal for sensing a touch, the plurality of electrodes 120 may operate as a touch electrode for sensing the touch.

The plurality of lines 130 may be provided to connect the plurality of electrodes 120 with the touch IC 200. For example, the plurality of lines 130 may transmit the touch scan signal applied from the touch IC 200 to the plurality of electrodes 120 of the panel 100, and transmit a capacitance variation received from the plurality of electrodes 120 of the panel 100 to the touch IC 200.

The touch IC 200 applies the touch scan signal to the plurality of electrodes 120 every logic period of a horizontal sync signal Hsync, wherein the touch IC 200 applies the touch scan signal, at least once, to the plurality of electrodes 120 during one frame.

In other words, the touch IC 200 applies the touch scan signal to any one or more electrodes selected among the plurality of electrodes every low logic period of the horizontal sync signal Hsync. For example, when the touch scan signal is applied to any one or more electrodes selected during the first low logic period of horizontal sync signal Hsync, the touch scan signal is applied to another one or more electrodes, which is not applied with the touch scan signal during the first low logic period, during the second low logic period of horizontal sync signal Hsync. Thus, the touch scan signal may be applied to all the electrodes 120 of the panel 100 during one frame.

In case of the display device with integrated touch screen according to one embodiment of the present invention, if the touch scan signal is applied once to all the electrodes 120 during one frame, the touch IC 200 again applies the touch scan signal to the electrode, to which the touch scan signal is applied during the first low logic period, during the low logic period of the next horizontal sync signal Hsync. According to the above operation, the touch IC 200 may apply the touch scan signal, at least once, to all the electrodes 120 of the panel 100 during one frame.

Accordingly, display driving and touch driving may be time-divisionally driven according to one horizontal sync signal Hsync, instead of being time-divisionally driven according to a data enable (DE) signal during one frame period according to one vertical sync signal Vsync. Also, a frequency of applying the touch scan signal to the plurality of electrodes 120 of the panel 100 during one frame is increased so that a touch report rate is also increased, to thereby realize an accurate sensing performance for touch input or dragging.

The touch IC 200 according to one embodiment of the present invention may include a touch scan signal generator for generating the touch scan signal for sensing the touch input, to be supplied to the plurality of electrodes 120 of the panel 100. The touch scan signal may be a touch driving voltage, wherein a value of the touch driving voltage may be higher than a value of the common voltage for the display driving applied to the plurality of electrodes 120 of the panel 100. In this case, the touch driving voltage may have a low level voltage corresponding to the common voltage, and may have a high level voltage which is relatively higher than the low level voltage.

The touch IC 200 according to one embodiment of the present invention may include a touch sensor which receives the touch sensing signal from the plurality of electrodes 120, calculates the touch coordinates through the use of touch sensing signal, and performs a function of sensing a user's touch. In this case, the calculated touch coordinates may be transmitted to the system 600, to thereby sense the user's touch coordinates of the panel 100.

In comparison to the elements of FIG. 3, the display device with integrated touch screen according to another embodiment of the present invention, which is shown in FIG. 4, may include the additionally-provided switch 210. Also, in case of the display device with integrated touch screen according to another embodiment of the present invention, the plurality of electrodes 120 are divided into three groups.

The plurality of electrodes 120 may be divided into the three groups 110 including first group 111, second group 112, and third group 113, whereby the plurality of electrodes 120 may be configured in the block-type group 110. Especially, the plurality of groups may be divided in a gate line direction.

In the display device with integrated touch screen according to another embodiment of the present invention, the plurality of electrodes 120 are divided into the n-numbered groups, and the touch scan signal is sequentially supplied to the divided n-numbered groups. For convenience of explanation, the case of dividing the plurality of electrodes 120 into the three groups is described in detail. However, the number of groups is not limited to the three. That is, the number of groups may be two, four, or more.

As shown in FIG. 4, the switch 210 performs a switching function to apply the touch scan signal which is outputted from the touch IC 200 to any one group among the three groups.

For example, the switch 210 performs the switching function to apply the touch scan signal generated in the touch IC 200 to the electrodes 120 included in any one group among the first, second and third groups of the panel 100.

In other words, the switch 210 is switched to apply the touch scan signal to any one group of the three groups 111, 112 and 113 of the panel 100 during the first low logic group period of horizontal sync signal Hsync; to apply the touch scan signal to another group, which is not applied with the touch scan signal, among the three groups 111, 112 and 113 of the panel 100 during the second low logic group period of horizontal sync signal Hsync; and to apply the touch scan signal to the other group, which is not applied with the touch scan signal, among the three groups 111, 112 and 113 of the panel 100 during the third low logic group period of horizontal sync signal Hsync. In this case, the low logic group period of horizontal sync signal Hsync may the period including the plural low logic periods of horizontal sync signal Hsync, also may be the period for which the touch scan signal is applied to all the electrodes included in one group.

The switch 210 of the display device with integrated touch screen according to another embodiment of the present invention may be switched to again apply the touch scan signal to the group, which is first applied with the touch scan signal, among the three groups during the fourth low logic group period.

In this case, each switch 210 is connected with one electrode by group. Especially, each switch 210 according to one embodiment of the present invention may be 1 to 3 demultiplexer.

Also, the switch 210 included in the touch IC 200 may be switched to apply the touch scan signal outputted from the touch IC 200 to any one among the three groups during the low logic group period of horizontal sync signal Hsync.

Referring once again to FIG. 2, the gate driver 300 sequentially supplies a gate signal to gate lines so as to supply the data voltage to the pixels of the panel 100 during a high logic period of horizontal sync signal Hsync.

For example, the gate driver 300 sequentially supplies the gate signal to gate lines GL1 to GLm, selects the line of the panel 100 to be inputted with the data voltage. Thus, the pixel of the panel 100 may be charged with the data voltage inputted from the data driver 400 during the high logic period of horizontal sync signal in response to the gate signal, and maintains the data voltage during the low logic period of horizontal sync signal Hsync.

In other words, the gate driver 300 generates the gate signal with gate-on voltage Von by shifting a gate start pulse GSP, which is received from the timing controller 500, according to a gate shift clock GSC, and sequentially supplies the gate signal with gate-on voltage to the gate lines GL1 to GLn. The gate driver 300 supplies a gate-off voltage Voff to the gate lines GL1 to GLn during the remaining period which is not supplied with the gate signal with the gate-on voltage Von. In this case, the gate signal may include a gate scan signal.

Meanwhile, the gate driver 300 applied to the present invention may be separately provided from the panel 100. That is, the gate driver 300 may be configured in such a way that the gate driver 300 may be electrically connected with the panel 100 in various methods. However, the gate driver 300 may be configured in a gate-in panel GIP method, that is, the gate driver 300 may be provided inside the panel 100. In this case, a gate control signal for controlling the gate driver 300 may be a start signal VST, and a gate clock GCLK.

The data driver 400 converts RGB data inputted from the timing controller 500 into the data voltage, and outputs the data voltage. The data voltage outputted from the data driver 400 is supplied to the data lines DL1 to DLn.

In other words, the data driver 400 sequentially generates sampling signals by shifting a source start pulse SSP, which is received from the timing controller 500, according to a source shift clock SSC. The data driver 400 latches pixel data (RGB, video data), which is inputted according to the source shift clock SSC, according to the sampling signal, converts the latched pixel data into a data signal, and then supplies the data signal to the data lines in units of horizontal line in response to a source output enable SOE signal. The data signal may include the data voltage.

To this end, the data driver 400 may include a data sampling unit, a latch unit, a digital-to-analog converter, and an output buffer.

The timing controller 500 receives timing signals such as vertical sync signal Vsync, horizontal sync signal Hsync, data enable DE signal and main clock MCLK, which are inputted from the system 600, and then generates the control signals GCS and DCS for controlling an operation timing of the gate driver 300 and the data driver 400. Also, the timing controller 500 re-aligns the RGB data inputted from the system 600, and outputs the re-aligned RGB data to the data driver 400.

Herein, the vertical sync signal Vsync is a signal for defining one frame period. Thus, one cycle of the vertical sync signal Vsync is set to one frame period. Also, the horizontal sync signal Hsync is a signal for defining one horizontal period which is required for recording data in the pixels of one line in a pixel array of the panel 100. Accordingly, one cycle of the horizontal sync signal Hsync may be set to one horizontal period, and one horizontal period may be obtained by dividing one frame period by the number of lines of the panel 100. The data enable DE signal is the signal for defining a period when effective data is inputted, and one cycle is set to one horizontal period in the same manner as the horizontal sync signal Hsync. The main clock MCLK is synchronized with a bit of the RGB data.

The system 600 of the display device with integrated touch screen according to the embodiment of the present invention provides the timing signals Vsync, Hsync, DE and MCLK to the timing controller 500. In this case, RGB data for one line is synchronized with the high logic period of horizontal sync signal, and is transmitted to the timing controller 500. However, RGB data for one line is not transmitted to the timing controller 500 during the low logic period of horizontal sync signal. Herein, 'Vsync' represents the vertical sync signal, and 'Hsync' represents the horizontal sync signal.

Also, the system 600 performs a program related with the touch coordinates value so as to make the touch coordinates from the touch IC 200 be recognized in the panel 100.

Meanwhile, the driving method of the display device with integrated touch screen according to one embodiment of the present invention is characterized in that the electrodes are driven to sense the touch, and the touch scan signal is applied to sense the touch according to the horizontal sync signal, which will be described in detail with reference to FIGS. 2, 3, 5 and 6.

Figure 5:
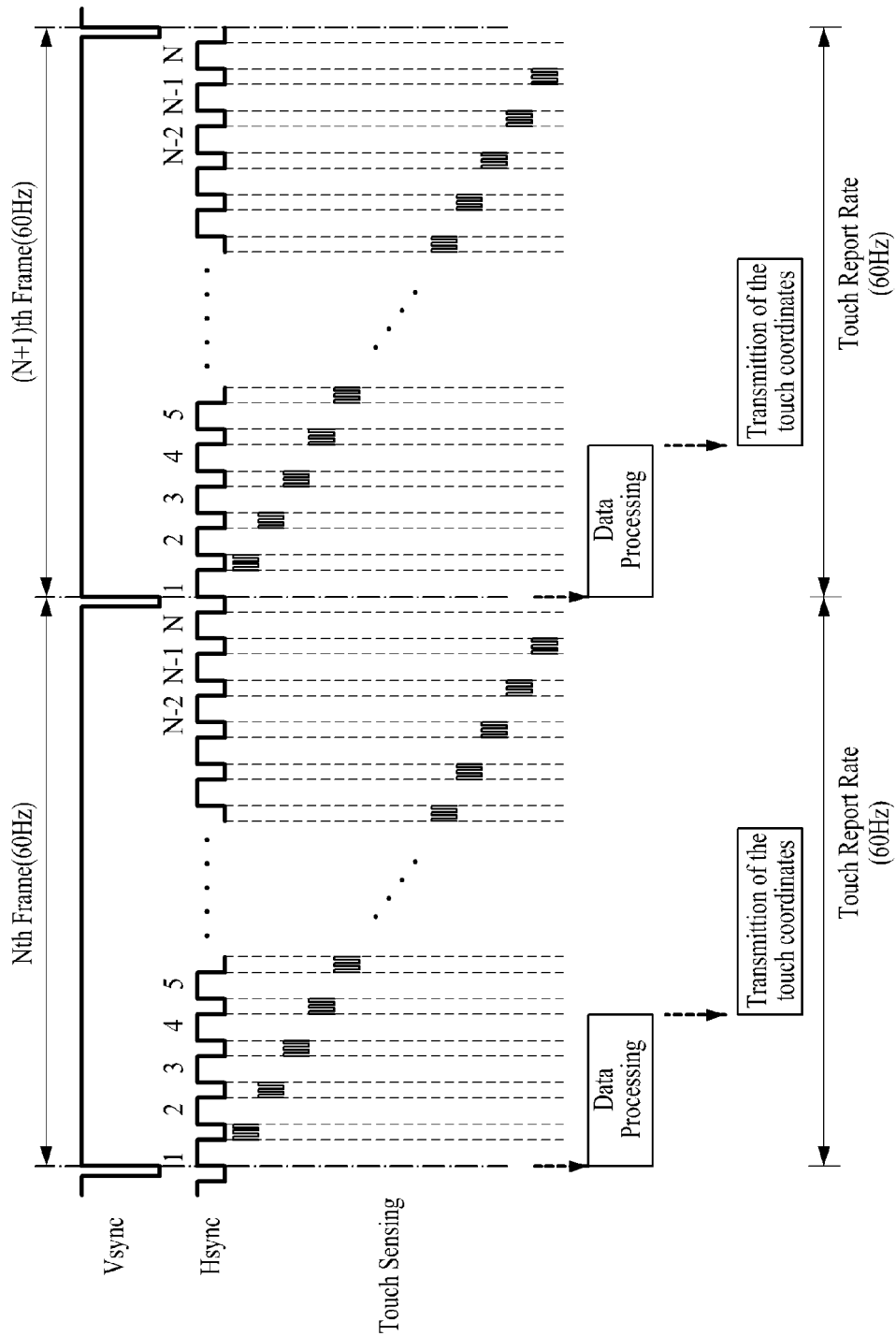
FIG. 5 is a signal timing diagram illustrating a driving method according to one horizontal sync signal in a display device with integrated touch screen according to one embodiment of the present invention.

FIG. 5 is a signal timing diagram illustrating the driving method according to one horizontal sync signal in the display device with integrated touch screen according to one embodiment of the present invention.

In the driving method of the display device with integrated touch screen according to one embodiment of the present invention, the gate driver 300 sequentially supplies gate signal to gate lines so as to supply the data voltage to the pixels of the panel 100 during a high logic period of horizontal sync signal Hsync.

For example, the gate driver 300 sequentially supplies the gate signal to gate lines GL1 to GLm, selects the line of the panel 100 to be inputted with the data voltage. Thus, the pixel of the panel 100 may be charged with the data voltage inputted from the data driver 400 during the high logic period of horizontal sync signal in response to the gate signal, and maintains the data voltage during the low logic period of horizontal sync signal Hsync.

Then, the touch IC 200 applies the touch scan signal to the plurality of electrodes 120 every low logic period of horizontal sync signal Hsync, and applies the touch scan signal, at least once, to the respective electrodes 120 during one frame.

If the touch scan signal is applied to any one or more electrodes selected during the first low logic period of horizontal sync signal Hsync, the touch scan signal is applied to another one or more electrodes, which is not applied with the touch scan signal during the first low logic period, during the second low logic period of horizontal sync signal. Thus, the touch scan signal may be applied to all the electrodes 120 of the panel 100 during one frame.

Then, the touch IC 200 receives the touch sensing signal from the plurality of electrodes 120 of the panel 100, to thereby calculate the touch coordinates.

For example, the touch IC 200 applies the touch scan signal once to all the electrodes 120 of the panel 100 during one frame, receives the touch sensing signal from the plurality of electrodes 120, and then calculates the touch coordinates while the touch scan signal of the next frame is applied to the plurality of electrodes 120.

In the driving method of the display device with integrated touch screen according to one embodiment of the present invention, one frame may be divided into the display period and the touch period through the use of horizontal sync signal Hsync, instead of using the data enable (DE) signal.

Hereinafter, another driving method according to one horizontal sync signal in the display device with integrated touch screen according to one embodiment of the present invention will be described in detail as follows.

Generally, in case of the in-cell type touch screen display, a frequency for transmitting new data to all pixels of a panel is referred to as a display frame rate, and a frequency for transmitting touch data obtained in a touch screen to a system is referred to as a touch report rate. That is, if the touch report rate is higher than the display frame rate, a speed for transmitting the coordinates of the touch input in the panel 100 becomes faster, to thereby improve touch sensitivity and to realize accuracy of touch input. Hereinafter, the above properties will be described with reference to FIG. 6.

Figure 6:
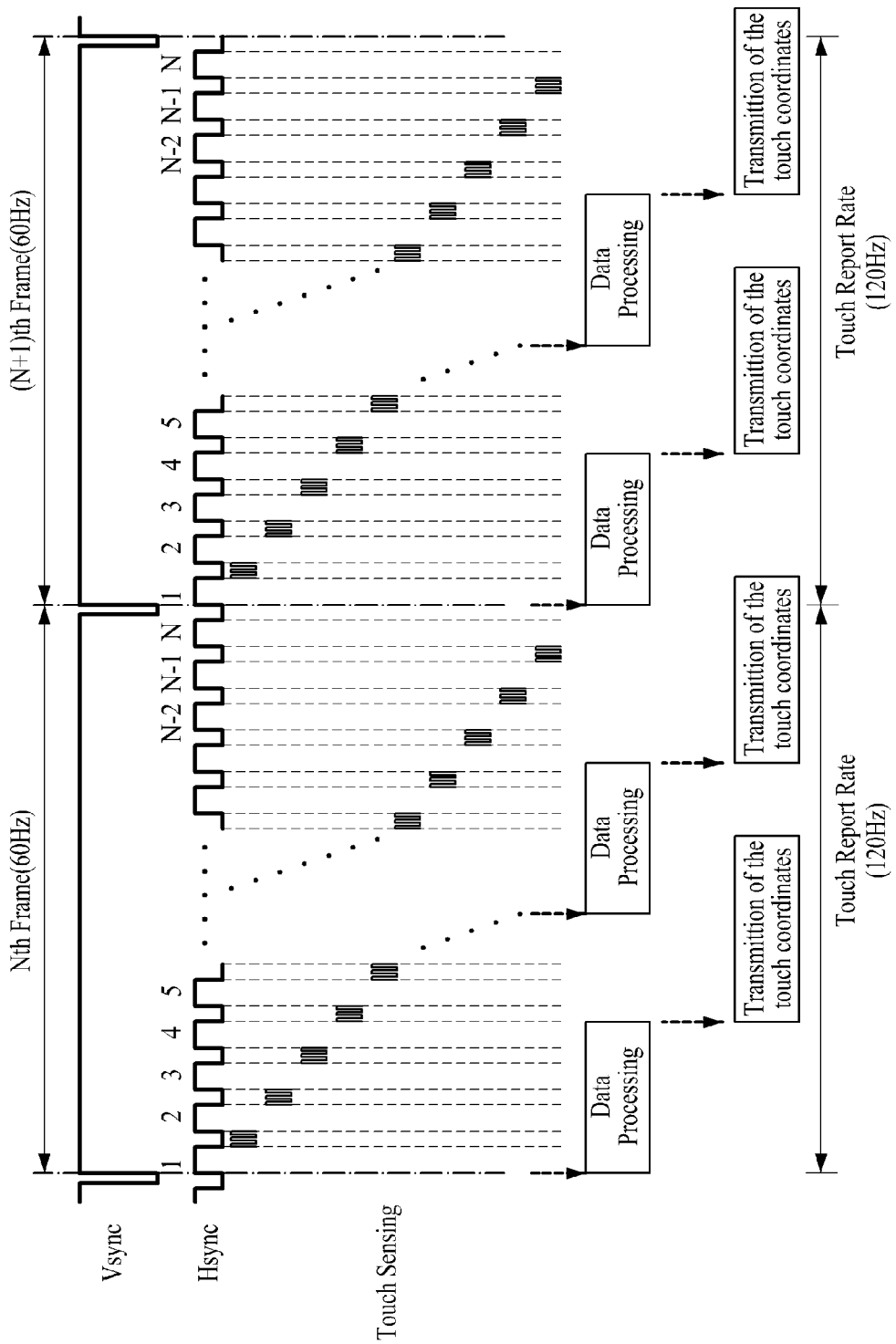
FIG. 6 is a signal timing diagram illustrating another driving method according to one horizontal sync signal in a display device with integrated touch screen according to one embodiment of the present invention.

FIG. 6 is a signal timing diagram illustrating another driving method according to one horizontal sync signal in the display device with integrated touch screen according to one embodiment of the present invention.

In another driving method of the display device with integrated touch screen according to one embodiment of the present invention, the gate driver 300 sequentially supplies gate signal to gate lines so as to supply the data voltage to the pixels of the panel 100 during a high logic period of horizontal sync signal Hsync.

For example, the gate driver 300 sequentially supplies the gate signal to gate lines GL1 to GLm, selects the line of the panel 100 to be inputted with the data voltage. Thus, the pixel of the panel 100 may be charged with the data voltage inputted from the data driver 400 during the high logic period of horizontal sync signal in response to the gate signal, and maintains the data voltage during the low logic period of horizontal sync signal Hsync.

Then, the touch IC 200 applies the touch scan signal to the plurality of electrodes 120 every low logic period of horizontal sync signal Hsync, and applies the touch scan signal, at least once, to the respective electrodes 120 during one frame.

In case of the embodiment shown in FIG. 6, the touch scan signal is applied twice to each of the respective electrodes 120 during one frame.

The touch IC 200 applies the touch scan signal to any one or more electrodes selected every low logic period of horizontal sync signal. For example, if the touch scan signal is applied to any one or more electrodes selected during the first low logic period of horizontal sync signal Hsync, the touch scan signal is applied to another one or more electrodes, which is not applied with the touch scan signal during the first low logic period, during the second low logic period of horizontal sync signal. Thus, the touch scan signal may be applied to all the electrodes 120 of the panel 100 during one frame.

In case of the touch IC 200 of the display device with integrated touch screen according to one embodiment of the present invention, if the touch scan signal is applied to all the electrodes 120 during one frame, the touch scan signal is again applied to the electrode, to which the touch scan signal is applied during the first low logic period, during the low logic period of the next horizontal sync signal. According to the above operation, the touch IC 200 may apply the touch scan signal twice to all the electrodes 120 of the panel during one frame.

Then, the touch IC 200 calculates the touch coordinates by receiving the touch sensing signal from the plurality of electrodes 120 of the panel 100. For example, the touch IC 200 applies the touch scan signal to all the electrodes 120 of the panel 100 during one frame, senses the touch sensing signal from the plurality of electrodes 120, and calculates the touch coordinates while the touch scan signal is again applied to all the electrodes 1200 during one frame.

The display frame rate of the display device with integrated touch screen according to one embodiment of the present invention is 60 Hz, and the touch scan signal is applied twice to each of the plural electrodes 120 of the panel 100 during one frame in the same manner as the above-mentioned driving method according to one horizontal sync signal, so that it is possible to transmit the touch sensing data, which is obtained in the entire touch screen, twice to the system during one frame, to thereby secure the touch report rate of 120 Hz.

According as the touch report rate of the touch sensing signal during one frame is higher than the display frame rate during one frame, the speed of transmitting the coordinates of the touch input of the panel 100 becomes faster, to thereby improve touch sensitivity and to realize accuracy of touch input.

Hereinafter, another driving method of the display device with integrated touch screen according to one embodiment of the present invention will be described in detail with reference to FIGS. 2, 4, and 7.

Figure 7:
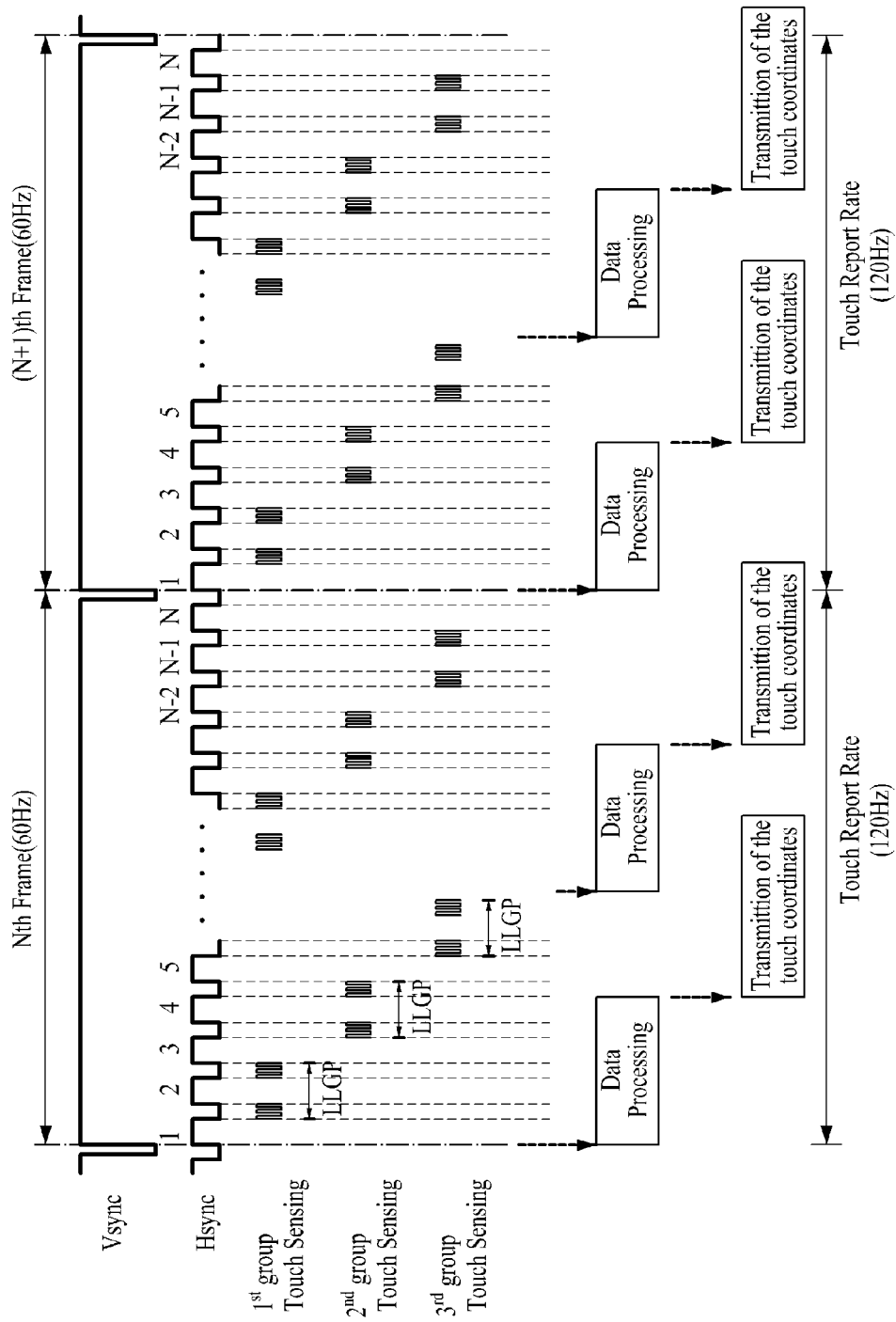
FIG. 7 is a signal timing diagram illustrating another driving method according to one horizontal sync signal in a display device with integrated touch screen according to one embodiment of the present invention.

FIG. 7 is a signal timing diagram illustrating another driving method according to one horizontal sync signal in the display device with integrated touch screen according to one embodiment of the present invention.

In the driving method of the display device with integrated touch screen according to one embodiment of the present invention, the gate driver 300 sequentially supplies gate signal to gate lines so as to supply the data voltage to the pixels of the panel 100 during a high logic period of horizontal sync signal Hsync.

For example, the gate driver 300 sequentially supplies the gate signal to gate lines GL1 to GLm, selects the line of the panel 100 to be inputted with the data voltage. Thus, the pixel of the panel 100 may be charged with the data voltage inputted from the data driver 400 during the high logic period of horizontal sync signal in response to the gate signal, and maintains the data voltage during the low logic period of horizontal sync signal Hsync.

Then, the touch IC 200 applies the touch scan signal to any one of the three groups during the three of low logic periods of horizontal sync signal Hsync, and applies the touch scan signal, at least once, to each of the three groups.

For example, the touch IC 200 applies the touch scan signal to any one group of the three groups 111, 112 and 113 of the panel 100 during the first low logic group period LLGP of horizontal sync signal; applies the touch scan signal to another group, which is not applied with the touch scan signal, among the three groups 111, 112 and 113 of the panel 100 during the second low logic group period LLGP of horizontal sync signal; and applies the touch scan signal to the other group, which is not applied with the touch scan signal, among the three groups 111, 112 and 113 of the panel 100 during the third low logic group period LLGP of horizontal sync signal.

In this case, the low logic group period LLGP of horizontal sync signal, as shown in FIG. 7, may the period including the plural low logic periods of horizontal sync signal, also may be the period for which the touch scan signal is applied to all the electrodes included in one group.

Also, the low logic group period LLGP of horizontal sync signal shown in FIG. 7 comprises the two low logic periods, for convenience of explanation. However, it is not limited to the two. For example, if there are the N-numbered horizontal sync signals in FIG. 7, one low logic group period may include the (N/6)-numbered low logic periods.

Then, the touch IC 200 receives the touch sensing signal from the plurality of electrodes 120, and calculates the touch coordinates among the low logic group periods applied with the next touch scan signal.

For example, the touch IC 200 calculates the touch coordinates of the first group sensed through the touch scan signal applied during the first low logic group period between the period for which the touch scan signal is applied to the first group of the first low logic group period and the period for which the touch scan signal is applied to the second group of the second low logic group period; and calculates the touch coordinates of the second group sensed through the touch scan signal applied during the second low logic group period between the period for which the touch scan signal is applied to the second group of the second low logic group period and the period for which the touch scan signal is applied to the third group of the third low logic group period.

In the driving method of the display device with integrated touch screen according to one embodiment of the present invention, one frame may be divided into the display period and the touch period through the use of horizontal sync signal Hsync, instead of using the data enable (DE) signal.

The display frame rate of the display device with integrated touch screen according to another embodiment of the present invention is 60 Hz, and the touch scan signal is applied twice to each group of the panel 100 during one frame in the same manner as the above-mentioned driving method according to one horizontal sync signal, so that it is possible to transmit the touch sensing data, which is obtained in each group, twice to the system by each group during one frame, to thereby secure the touch report rate of 120 Hz.

According as the touch report rate of the touch sensing signal during one frame is higher than the display frame rate during one frame, the speed of transmitting the coordinates of the touch input of the panel 100 becomes faster, to thereby improve touch sensitivity and to realize accuracy of touch input.

According to the embodiment of the present invention, the in-cell type touch screen of the self-capacitive type is time-divisionally driven in the display driving and touch driving modes by one line unit according to one horizontal sync signal, instead of one frame unit according to one vertical sync signal.

According to the embodiment of the present invention, the display driving time and touch driving time are divided in unit of one horizontal sync signal, to thereby decrease a memory size and to reduce a cost.

Moreover, the touch report rate is increased so that it is possible to realize the accurate sensing performance for touch input or dragging.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A display device with integrated touch screen, comprising:
   a panel including a plurality of electrodes, which are divided into n-numbered groups wherein 'n' is an integer equal to or greater than two;
   a data driver for converting RGB data inputted from a timing controller into a data voltage, and supplying the data voltage to data lines;
   a gate driver for sequentially supplying a gate signal to gate lines so as to apply the data voltage to pixels of the panel during a high logic period of a horizontal sync signal;
   a touch IC for supplying a touch scan signal to the plurality of electrodes every low logic period of the horizontal sync signal; and
   a plurality of switches being switched to apply the touch scan signal outputted from the touch IC to any one of the n-numbered groups,
   wherein the touch IC applies the touch scan signal, at least once, to each electrode in the plurality of electrodes during one frame,
   wherein the touch scan signal is sequentially supplied to the divided n-numbered groups of the plurality of electrodes,
   wherein in the panel of the display device, each of the pixels includes its own individual electrode of the plurality of electrodes together with a pixel electrode, and liquid crystal in each pixel is driven by the individual electrode together with the pixel electrode,
   wherein the plurality of electrodes are arranged in a grid including a plurality of rows and a plurality of columns, and
   wherein each row of the plurality of rows includes a plurality of electrodes and each column of the plurality of columns includes a plurality of electrodes.

2. The display device of claim 1, wherein the touch IC calculates touch coordinates by receiving the touch sensing signal from the plurality of electrodes.

3. The display device of claim 2, wherein a touch report rate of the touch sensing signal during one frame is higher than a display frame rate during one frame.

4. The display device of claim 1, wherein the plurality of switches are switched to apply the touch scan signal to any one of the n-numbered groups of the panel during a low logic group period.

5. The display device of claim 1, wherein the low logic group period is the period including the every low logic period of horizontal sync signal, and is also the period for which the touch scan signal is applied to all the electrodes included in any one of the n-numbered groups.

6. The display device of claim 1, wherein each of the switches is connected with one electrode of each of the n-numbered groups.

7. The display device of claim 1, wherein each switch in the plurality of switches is one of a plurality of 1 to n demultiplexers.

8. The display device of claim 1, wherein the touch IC includes a plurality of 1 to n demultiplexers switched to apply the touch scan signal outputted from the touch IC to any one of the n-numbered groups.

9. A method of driving a display device with integrated touch screen comprising a panel including a plurality of electrodes, a touch IC, a plurality of switches, a gate driver and a data driver, the method comprising:

applying a data voltage to pixels of the panel during a high logic period of a horizontal sync signal by the gate driver and the data driver; and supplying a touch scan signal to the plurality of electrodes every low logic period of the horizontal sync signal by the touch IC, wherein the plurality of electrodes are divided into n-numbered groups wherein 'n' is an integer equal to or greater than two, wherein the plurality of switches are switched to apply the touch scan signal outputted from the touch IC to any one of the n-numbered groups, wherein the step of applying the touch scan signal is carried out by applying the touch scan signal, at least once, to each electrode in the plurality of electrodes during one frame, wherein the touch scan signal is sequentially supplied to the divided n-numbered groups of the plurality of electrodes, wherein in the panel of the display device, each of the pixels includes its own individual electrode of the plurality of electrodes together with a pixel electrode, and liquid crystal in each pixel is driven by the individual electrode together with the pixel electrode, wherein the plurality of electrodes are arranged in a grid including a plurality of rows and a plurality of columns, and wherein each row of the plurality of rows includes a plurality of electrodes and each column of the plurality of columns includes a plurality of electrodes.

10. The method of claim 9, further comprising receiving the touch sensing signal in the touch IC from the plurality of electrodes, and calculating touch coordinates by the touch IC.

11. The method of claim 10, wherein a touch report rate of the touch sensing signal during one frame is higher than a display frame rate during one frame.

\* \* \* \* \*